Dec. 10, 1968  H. VODINH  3,415,472
SHAFT-MOUNTING DEVICE
Filed Jan. 3, 1967
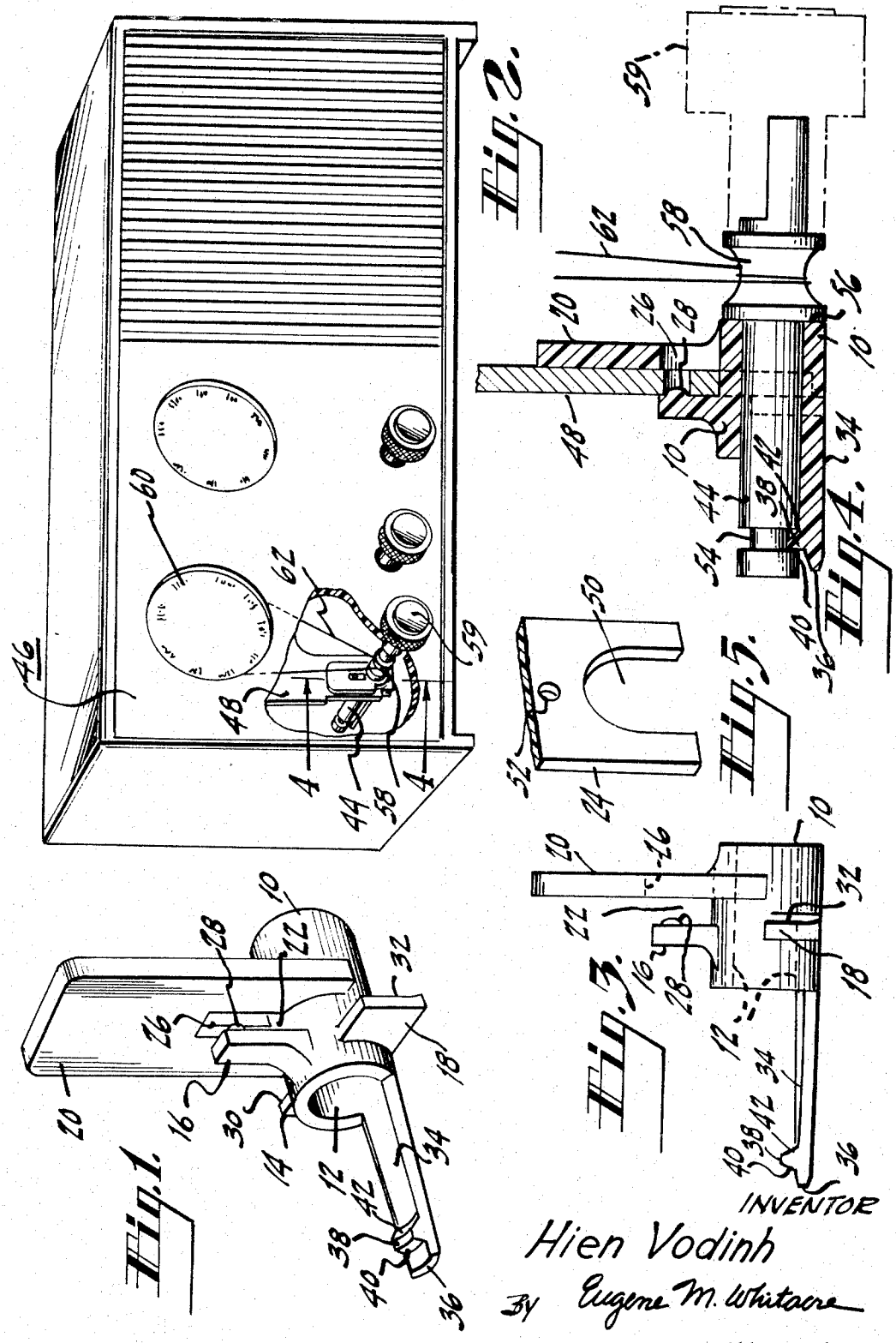
INVENTOR
Hien Vodinh
By Eugene M. Whitacre
ATTORNEY

3,415,472
SHAFT-MOUNTING DEVICE
Hien Vodinh, Indianapolis, Ind., assignor to Radio Corporation of America, a corporation of Delaware
Filed Jan. 3, 1967, Ser. No. 606,792
6 Claims. (Cl. 248—27)

ABSTRACT OF THE DISCLOSURE

A one piece support member includes a cylindrical first portion adapted to receive and retain a rotatable control shaft, and a second portion shaped to provide for mounting of said support member on a bracket or support piece without the need of additional hardware.

---

This invention relates to a fastening device, and more particularly to a support member adapted to mount a rotatable shaft on a support piece.

In some radio receivers, for example, the tuning control shaft has heretofore been journaled in a brass bushing and then axially retained therein by means such as a C-washer or the like. The bushing was usually fastened directly to the receiver chassis or a bracket upstanding therefrom by means of a retaining ring and/or a nut and washer assembly.

An object of the present invention is to provide a unitary bushing and fastening member adapted to receive and mount a rotatable shaft on a support piece.

Another object of the invention is to provide a support member for mounting a rotatable shaft on a support piece, said member being of relatively simple construction and economical to manufacture.

A support member in accordance with the invention includes a first portion formed with an elongated opening therein adapted to receive a rotatable shaft and a second portion forming an extension of the first portion and overlying a portion of the shaft receivable in the opening. Means are provided to limit axial movement of the shaft in the opening and for fixedly attaching the support member to a support piece.

While numerous uses for a support member of the type contemplated herein will suggest themselves, the support member is particularly suitable for mounting the control shaft associated with the frequency tuning mechanism assembly in a radio receiver, for example, on a cabinet support piece or chassis.

Other objects, uses and advantages of the invention will become apparent from the following description and accompanying drawing wherein:

FIGURE 1 is a perspective view showing a shaft mounting support member incorporating features of the present invention;

FIGURE 2 is a perspective view of a radio receiver partially broken away and showing the support member of FIGURE 1 utilized to mount a control shaft associated with the tuning mechanism of the receiver;

FIGURE 3 is a side elevation view of the device shown in FIGURE 1;

FIGURE 4 is a sectional view taken along the section line 4—4 of FIGURE 2; and

FIGURE 5 is an enlarged perspective view of a portion of the support bracket shown in FIGURE 4 and used to mount the support member of the invention.

Referring now to the drawing, and particularly to FIGURES 1 and 3, a support member in accordance with the invention comprises a cylindrical body portion 10 having a bore or aperture 12 extending axially therethrough to provide a bearing for receiving and mounting a shaft. The support member includes three substantially flat arm members 14, 16 and 18, and a flattened tongue-like member 20 extending radially of the body portion 10. The arm and tongue members have opposing surfaces substantially in parallel alignment with one another, and which define a clearance area 22 therebetween for mounting the support member on a bracket or support piece, as shown for example, in FIGURES 2 and 4 and as will be hereinafter described.

A cutout or window 26 may be provided in the tongue member 20 and the opposing surface of the central arm member 16 includes a small projection or protuberance 28 directed toward the tongue cutout 26. The parallel surfaces 30 and 32 of the respective adjacent arm members 14 and 18, each are tapered slightly with respect to the central arm member 16 so that the bottom edges of these arm members are closer to the plane of the tongue member 20.

A second portion 34 comprising a portion of a hollow cylinder aligned and integrally formed with the body portion 10 extends outwardly from one end so as to form a cutaway or channel shaped extension thereof. As shown in FIGURE 1, the free end of the second portion 34 is provided with an axial extension 36, hereinafter referred to as the release tab, and a raised projection or ridges 38, hereinafter referred to as the locking tab. The side edges 40 and 42 of the locking tab 38 are tapered slightly so as to minimize radial and longitudinal play of a received shaft as well as to facilitate assembly thereof as will be hereinafter described.

The support member may comprise a molded tough and slightly resilient plastic material such as Delrin.

FIGURES 2 and 4 illustrate the use of the support member in the assembly of a tuning control shaft 44 in a radio receiver 46. Attached to or forming part of the receiver chassis (not shown) is a support bracket 48, the end portion of which is bifurcated to provide an inverted U-shaped recess 50 (FIGURE 5).

The support member is mounted on the receiver chassis by engagement of at least a portion of the body 10 within the bracket recess 50, such that the bifurcated portions of the bracket surrounding the recess 50 are grasped within the area 22 defined by the parallel surfaces of the support member arm and tongue members. The support bracket may include an aperture or dimple 52 spaced above the recess 50 to mate with and receive the protuberance 28 on the central arm member 16 and provide for a "snap action" assembly of the support member and bracket.

The thickness or width of the clearance area 22 is slightly less than that of the bracket received therein so that during the mounting of the support member on the bracket 24, the support member arm and tongue members are caused to resiliently bend slightly and spread apart so as to provide a tight frictional coupling with the received bifurcated end of the bracket. This frictional coupling is further enhanced by a "wedging" action produced by the tapered surfaces 30 and 32 of the arm members 14 and 18 acting against the bifurcated end portion of the bracket 24.

As shown in FIGURE 4, the receiver control shaft 44 is formed with an annular groove 54 near one end, and a cord spool 58 formed near the other end. A knob 59 is mounted on the shaft 44 to facilitate manual rotation thereof.

The receiver tuning control shaft 44 is inserted through the bore 12 in the support member body portion 10 until the end of the shaft is pushed past the locking tab 38 thereby forcing the second portion 34 extension of the body 10 to resiliently deflect until the locking tab 38 falls into place in the annular groove 54 provided near the end of the shaft 44. As heretofore mentioned, the locking tab 38 is provided with tapered side edges 40 and 42. The tapered edge 42 permits the end of the shaft to ride up the edge and thereby exert a force in a direction to cause a deflection of the second portion 34 until the tab 38 engages the shaft groove 54. The tab edge 40 is tapered such when the tab 38 is in the shaft groove 54, the edge 40 exerts a vertical force component against a contacting side wall of the shaft groove to reduce radial play of the shaft within the bore 12, and a horizontally directed force component against said contacting side wall of the shaft groove which tends to pull the shaft 44 axially against the support member so that the collar portion 56 of the shaft abuts up against the peripheral edge of the body portion 10, thereby to minimize longitudinal play. Thus, the tab 38 and groove 54 arrangement provides for a simple "snap action" assembly of the shaft and support member.

Rotation of the shaft 44 is translated to the receiver tuning condenser (not shown) and station indicating dial 60 by means of a dial cord 62 strung between the cord spool portion 58 of the shaft 44 and a drive pulley (not shown) associated with the receiver tuning condenser and indicating dial 60.

Disassembly of the shaft 44 from the support member is accomplished by moving the release tab 36 in a direction away from the shaft 44 so as to sufficiently deflect the second portion 34 and the locking tab 38 to allow for the withdrawal of the shaft through the body portion 10 of the support member.

What is claimed is:

1. A one piece support member for mounting a rotatable shaft on a support piece comprising:
   a body portion formed with an elongated opening therein adapted to receive said rotatable shaft;
   a pair of resilient spaced apart parallel elements carried on said body portion and adapted to fit over and grasp the support piece therebetween; and
   a second portion which is an extension of said body portion is formed with a projection to fit into a groove in the shaft when the shaft is in place in the support member, and which is sufficiently resilient to permit the free end of the shaft to be forced past said projection and the projection subsequently to move into place in the groove when the two are aligned.

2. A one piece support member as defined in claim 1 wherein said second portion includes a tab-like extension at its free end adapted to be grasped and moved so as to lift the projection on said second portion out of said shaft groove thereby to permit the removal of said shaft from said elongated opening.

3. The combination of a rotatable shaft formed with an annular groove at one end and a support member for the shaft, said support member comprising:
   a cylindrical first portion formed with an aperture into which the shaft fits;
   a second portion comprising a portion of a hollow cylindrer aligned with the cylindrical first portion and formed with a ridge near its free end, said ridge being adapted to key with the annular groove in said shaft when the shaft is in place in the support member; and
   two parallel planar elements extending substantially perpendicularly from the axis of said first cylindrical portion, said planar elements being adapted to fit over and grasp a support piece.

4. A unitary support member of resilient material for mounting a shaft on a support piece comprising:
   a cylindrical first portion having a bore extending therethrough and adapted to receive said shaft;
   a second channel shaped portion formed as a partial cylindrical extension of said first portion adapted to overlie a portion of said shaft receivable in said bore;
   a first arm like member carried on said first portion and extending radially outward therefrom;
   second and third radial extending arm like members carried on said first portion and in planar alignment with said first arm like member;
   a flattened tongue like member extending radially outward from said cylindrical first portion parallel to said first arm like member;
   said tongue like member and said first arm member cooperating to define a clearance area therebetween for receiving a portion said support piece, thereby to mount said received shaft on said support piece.

5. A support member is defined in claim 4 wherein said second portion is formed with a projection to fit into a groove in the shaft when the shaft is in place in the support member.

6. A support member as defined in claim 5 wherein said projection includes a tapered edge which comes into engagement with a side wall of said shaft groove when said projection is in said groove, thereby to urge said shaft against said support member so as to minimize longitudinal movement of the shaft within said support member.

References Cited

UNITED STATES PATENTS

| | | | |
|---|---|---|---|
| 2,013,965 | 9/1935 | Knight | 285—158 |
| 2,145,160 | 1/1939 | Douglas | 248—27 XR |

JOHN PETO, *Primary Examiner.*

U.S. Cl. X.R.

248—223; 287—20